United States Patent
Ferrari

[15] 3,644,174
[45] Feb. 22, 1972

[54] PRESSURIZED FUEL ELEMENT

[72] Inventor: Harry M. Ferrari, Pittsburgh, Pa.

[73] Assignee: Westinghouse Electric Corporation, Pittsburgh, Pa.

[22] Filed: June 19, 1968

[21] Appl. No.: 738,237

[52] U.S. Cl. ............................................. 176/68, 176/79
[51] Int. Cl. ............................................................ G21c 3/04
[58] Field of Search ................... 176/68, 67, 34, 74, 79, 80

[56] References Cited

UNITED STATES PATENTS

| 3,235,466 | 2/1966 | Williams et al. | 176/68 |
|---|---|---|---|
| 3,274,070 | 9/1966 | Vanslager | 176/37 X |
| 3,274,066 | 9/1966 | Zumwalt | 176/37 X |
| 3,356,585 | 12/1967 | Zebroski | 176/68 |
| 3,399,112 | 7/1968 | Dodd | 176/37 X |
| 3,406,094 | 10/1968 | Beisswenger et al. | 176/68 X |
| 3,459,636 | 8/1969 | Germer | 176/68 |

*Primary Examiner*—Benjamin R. Padgett
*Assistant Examiner*—Gary G. Solyst
*Attorney*—A. T. Stratton and Z. L. Dermer

[57] ABSTRACT

A metallic clad sealed fuel element for a nuclear reactor is internally pressurized to resist creep collapse in the early stage of burnup. The fuel element has a normally sealed plenum chamber which is rupturable when a predetermined increased pressure is reached during burnup to provide a void space for fission gases.

7 Claims, 2 Drawing Figures

PATENTED FEB 22 1972                                          3,644,174

WITNESSES
Robert C. Baird
Michael B. L. Zipps

INVENTOR
Harry M. Ferrari.
BY
ATTORNEY

PRESSURIZED FUEL ELEMENT

CROSS-REFERENCE TO RELATED APPLICATION

This invention is related to and is an improvement to my copending application Ser. No. 702,631 (W.E. 39,391), filed Feb. 2, 1968.

BACKGROUND OF THE INVENTION

This invention relates to fuel elements for nuclear reactors, and more particularly to metallic clad sealed fuel elements which are internally pressurized during manufacture.

Fuel elements are subjected to a wide range of pressures during the operational cycle of nuclear reactors. Current fuel elements consist of refractory ceramic fuel contained with a thin-walled tubular metallic sheath. The metallic sheath is subject to the ambient pressure within the reactor during operation which is approximately 2,250 p.s.i. The internal pressure of the fuel element varies with burnup. In accordance with present practices the fuel element is initially sealed with an internal pressure at atmospheric level (about 15 p.s.i.). During burnup, fission gases given off by the ceramic fuel can cause appreciable increases in the internal pressure. Presently, fuel elements are constructed with a substantial void space to accumulate these fission gases. The void space is so sized that at the end of life pressure can only rise to the level of the ambient pressure at which the nuclear reactor is operated; 2,250 p.s.i. The pressure to which current fuel element cladding is subject may thus be seen to vary from almost reactor ambient, 2,250 p.s.i., to nearly none at the end of life.

The above environmental characteristics impose severe design limitations on present fuel elements. The cladding must be designed to withstand the fuel external pressure of 2,250 p.s.i. which can result in localized stresses in the area of 16,000 p.s.i. Moreover, the elements must be increased in size, usually by making them longer, to assure that fission gas accumulation will not cause the internal pressure to become greater than the external pressure, i.e., that a stress reversal does not occur.

SUMMARY OF THE INVENTION

The limitations on the design of metallic clad seal fuel elements may be rendered less severe by providing a fuel element which is internally pressurized during manufacture and which has a normally sealed rupturable chamber for reducing the internal pressure created by fission gases produced during burnup of nuclear fuels.

By way of example, an inert gas, e.g., helium, is injected into the fuel element with a substantial pressure before it is sealed. This pressure may be in the range of 300 to 500 p.s.i. at room temperature. When such a fuel element is placed in a nuclear reactor and heat is first generated the internal pressure is immediately increased to the range of 900 to 1,500 p.s.i. at reactor operating temperature. This means that pressure difference across the thin tubular cladding will be reduced to about 1,000 p.s.i. with localized stress levels of 8,000 p.s.i. as opposed to 16,000 p.s.i. now existing. The thickness of the cladding may be accordingly reduced.

The accumulation of fission gases would appear to be more severe in a pressurized fuel element such as that exemplified since the fuel element is at a relatively high pressure at the beginning of life. However, in accordance with this invention, one or more sealed cans or normally sealed diaphragm means is provided internally of the fuel elements. The can or the diaphragm means may be provided with a reduced or frangible section which ruptures when a predetermined pressure is reached during burnup. The internal pressure of the can or diaphragm may be at atmospheric level. Since the void space is at a negligible pressure at rupture, far less volume is necessary to keep fission gas pressures within design limitations. This results in a decrease in the size and particularly the length of the fuel element. Moreover, shorter fuel elements allow reductions in the size of the containing structure which results in appreciable savings.

DESCRIPTION OF THE DRAWINGS

For a better understanding of the invention, reference may be had to the accompanying drawings in which.

DESCRIPTION OF THE PREFERRED EMBODIMENT

Figure 1:
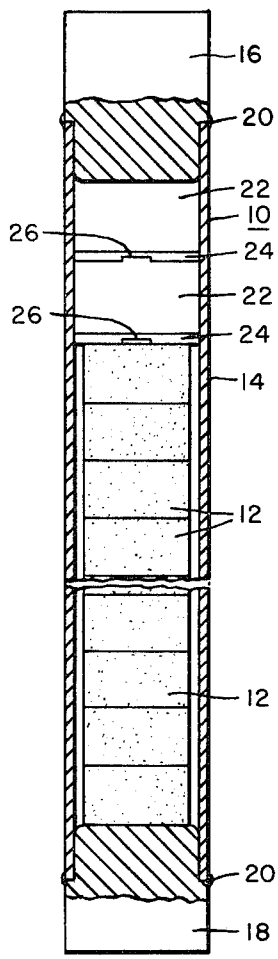
FIG. 1 shows a sectional view of fuel element representing one embodiment of the invention.

In FIG. 1 there is shown a fuel element 10 produced in accordance with the invention. Fuel element 10 includes a plurality of cylindrical nuclear fuel pellets 12 formed from a suitable nuclear fuel material such as uranium dioxide or plutonium dioxide disposed in end-to-end abutment within a thin-walled tubular sheath or cladding 14 formed from a suitable cladding material such as a zirconium alloy or a stainless steel.

The ends of the sheath 14 are closed by end plugs 16 and 18 desirably formed from the same material as cladding 14 and secured thereto with an annular welds 20, or other suitable means. The interior of the fuel element 10 is thereby hermetically sealed so that fission gases may not escape to contaminate the environs.

During manufacture the interior of the fuel element 10 is pressurized. This may be accomplished by sealing the fuel element in a high-pressure inert atmosphere such as helium. Another suitable process for obtaining an internally pressurized fuel element is to insert a thermally decomposable body within the element 10 during manufacture. Examples of processes for obtaining sufficient internal pressurization are described in my copending application Ser. No. 706,291 (W.E. 39,764), filed Feb. 19, 1968, now continuation-in-part application Ser. No. 850,198 filed Aug. 14, 1969.

In accordance with this invention and referring to FIG. 1, the interior of the fuel element 10 is provided with one or more wall means 24 which isolate normally sealed chambers 22 from the remainder of the interior of fuel element 10. The chambers 22, normally at atmospheric pressure, are designed to become accessible to fission gases upon a predetermined pressure being reached during burnup. This may be accomplished by providing walls 24 with sections 26 which open, fracture, or rupture when a predetermined pressure difference is exerted thereon exposing adjacent chamber 22 to the fission gases. The rupture pressure is so determined as to be higher than the internal pressure utilized at the beginning of life, but such that the internal pressure cannot reach the level of the external pressure on cladding 14.

Fuel elements designed to operate in present pressurized water reactors are subjected to external pressures of between 2,000 and 2,250 p.s.i. during operation. A representative temperature at the center of each pellet 12 is approximately 4,200° F. with a surface temperature of approximately 1,100° F. The cladding 14 has an average temperature range of between 650° F. and 800° F. during life.

Nuclear reactors that are not base load plants are subject to periodically changing power demands. These demands are generally cyclic over 24-hour periods. The pellets 12 and cladding 14 are thus subject to a wide range of cyclic temperature and pressure which are primarily reflected in a rather severe fatigue strain problem in the sheath 14.

Moreover, during life, as a suitable nuclear fuel such as uranium dioxide fissions radioactive gases such as xenon and krypton are released which can cause substantial increases in the internal pressure of the fuel element 10. In the past a relatively large void space was necessary to accommodate these fission gases. The problem of accommodating fission gases is, of course, even more severe where internal pressure is incorporated during manufacture.

Examples of fuel rods which are suitable for the severe environment of nuclear reactors, minimize stress levels in the cladding, and do nor require prohibitively long fission gas collection chambers are shown in the various figures. The embodiment of FIG. 1 has a sheath 14 constructed of a metal which is substantially inert to the environment existing within nuclear reactors as for example Zircaloy-2, Zircaloy-4, or 304-type stainless steel. The sheath 14 may have an outside diameter of 0.422 inch. The pellets 12 which may be of uranium dioxide have a preferred diameter of 0.367 inch. The thickness of the cladding, in view of the reduced stress levels to which it is subject, need only be 0.0075, assuming 304 stainless steel is used, as opposed to 0.015 inch which would have been required in fuel elements of the prior art, i.e., without internal pressurization. The reduction in cladding thickness of 0.0075 inch is calculated on the basis of a beginning-of-life internal pressurization of 1,200 p.s.i. Since the pressure in a fuel element 10 increases about threefold when heated by insertion in a nuclear reactor, this implies an internal pressure at room temperature of only around 400 p.s.i. need be obtained during manufacture.

The length of the fuel element 10 is primarily determined by the power requirements of the reactor in which it is to be used and the amount of void space necessary for a chamber or chambers 22 to collect the fission gases yielded during burnup. If the above fuel element 10 had 12 feet of pellets 12, 1 foot of additional length would be necessary in presently manufactured fuel elements 10. In accordance with this invention, a wall or walls 24 are provided which divide the void space into chambers 22 which are not pressurized during manufacture. Rupturable section 26 assures that sufficient fission gas collection volume will be available when required, i.e., section 26 ruptures at predetermined increased pressures. Since the chambers 22 are at a negligible pressure, as opposed to 1,200 p.s.i. which would otherwise exist, far less volume is required. Therefore, only 6 inches of additional length is required.

The wall 24 is welded or secured by other suitable processes to the interior wall of the sheath 14. The wall 24 may be approximately 0.035 inch thick. The reduced section 26 may be accordingly 0.012 inch thick to assure a selected rupture location. The section 26 may also be caused to fail at a predetermined pressure by selective grooving or etching.

Figure 2:
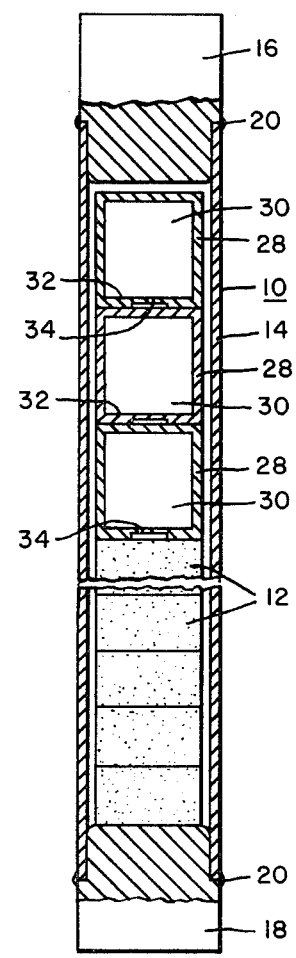
FIG. 2 shows a sectional view of fuel element representing another embodiment of the invention.

In the embodiment of FIG. 2, in which identical reference numerals identify similar elements, a fuel element 10 is shown which is in all respects identical with that of FIG. 1 except that a sealed generally cylindrical can or cans 28 are utilized to provide the fuel element 10 with normally sealed chambers; here designated by the numeral 30. The cans 28 replace the separator walls 24 of FIG. 1. The complexity of manufacture is reduced thereby since the cans 28 need not be welded or similarly affixed to the interior of the sheath 14; as is necessary where separator walls 24 are used. Each can 28 has a wall 32 with a rupturable or frangible section 34 which provides access of the fission gases to the interior of the cans 28 when a predetermined increased pressure is reached. The cans 28 may be 0.367 inch in diameter, constructed of 0.024 inch thick with a 0.012 inch thick rupture section 34. The rupture section 34 may be situated in the top, bottom, or side of the cans 28.

Where either separator walls 24 with rupturable section 26 or cans 28 with rupturable sections 34 are used, the sections 26 or 34 of multiple chambers 22 can all rupture at approximately the same predetermined pressure or their rupture pressures can be staggered. In the case of staggering rupture pressures, the decrease in pressure immediately after rupture is decreased which may have a beneficial affect since less fatigue would thereby result. Rupture pressures in the case of a pressurized water reactor would be in the range of 1,500 to 1,900 p.s.i.

While there have been shown and described what are at present considered to be the preferred embodiments of the invention, modifications thereto will readily occur to those skilled in the art. It is not desired, therefore, that the invention be limited to the specific embodiments shown and described and it is intended to cover in the appended claims all such modifications as fall within the true spirit and scope of the invention.

I claim:
1. A fuel element for nuclear reactors which comprises:
    a sealed generally tubular sheath containing nuclear fuel, said sealed sheath being internally pressurized initially with a gaseous atmosphere at a selected pressure above 100 p.s.i.,
    a sealed chamber totally contained within the sheath, said chamber being isolated from the internal pressure within the sheath, the interior of said chamber being at a lower pressure than that to which the sheath is pre-pressurized, and
    means rupturable for providing access to the interior of said chamber after a predetermined increase in the pressure within the sheath due to the accumulation of fission products.
2. The fuel element of claim 8 wherein said access providing means comprises a wall forming a part of said normally isolated chamber, said wall having a section rupturable at a predetermined pressure lower than that at which the remainder of the wall ruptures.
3. The fuel element of claim 2 wherein said wall separates the normally sealed chamber from said nuclear fuel.
4. The fuel element of claim 3 wherein the tubular sheath forms a wall of the normally isolated chamber.
5. The fuel element of claim 2 wherein said wall forms a wall of a sealed can which enclosed the low-pressure chamber.
6. The fuel element of claim 2 wherein said sheath includes a plurality of normally isolated chambers.
7. The fuel element of claim 6 wherein the rupturable section of each normally sealed chamber ruptures at a different predetermined pressure.

* * * * *